United States Patent
Hanna

(10) Patent No.: US 7,891,561 B2
(45) Date of Patent: Feb. 22, 2011

(54) CASH REDEMPTION OF GIFT CARDS SYSTEMS AND METHODS

(75) Inventor: Assaad G. Hanna, San Francisco, CA (US)

(73) Assignees: First Data Corporation, Greenwood Village, CO (US); The Western Union Corporation, Englewood, CO (US)

( * ) Notice: Subject to any disclaimer, the term of this patent is extended or adjusted under 35 U.S.C. 154(b) by 766 days.

(21) Appl. No.: 11/357,784

(22) Filed: Feb. 16, 2006

(65) Prior Publication Data

US 2007/0187494 A1  Aug. 16, 2007

(51) Int. Cl.
G06K 15/00 (2006.01)

(52) U.S. Cl. .................. 235/383; 235/379; 235/380

(58) Field of Classification Search ............ 235/383, 235/380, 379; 705/41
See application file for complete search history.

(56) References Cited

U.S. PATENT DOCUMENTS

| | | | |
|---|---|---|---|
| 6,575,362 B1 * | 6/2003 | Bator et al. ................. | 235/381 |
| 7,165,049 B2 * | 1/2007 | Slater ........................ | 705/41 |
| 7,249,054 B2 * | 7/2007 | Keil ........................... | 705/21 |
| 7,455,226 B1 * | 11/2008 | Hammond et al. ......... | 235/385 |
| 2003/0115100 A1 * | 6/2003 | Teicher ...................... | 705/14 |
| 2003/0167237 A1 * | 9/2003 | Degen et al. ............... | 705/64 |
| 2004/0133511 A1 * | 7/2004 | Smith et al. ................ | 705/39 |
| 2004/0153406 A1 | 8/2004 | Alarcon-Luther et al. | |
| 2005/0082364 A1 * | 4/2005 | Alvarez et al. ............. | 235/381 |
| 2007/0168283 A1 * | 7/2007 | Alvarez et al. ............. | 705/43 |
| 2008/0091599 A1 * | 4/2008 | Foss .......................... | 705/41 |

* cited by examiner

Primary Examiner—Ahshik Kim
(74) Attorney, Agent, or Firm—Kilpatrick Townsend & Stockton LLC

(57) ABSTRACT

A method of redeeming cash from a stored-value instrument is disclosed. The method may, at a point-of-sale ("POS") device associated with a money transfer network, receive an identifier associated with the stored-value instrument and transmit a request to redeem cash associated with the stored-value instrument to an instrument authority system. The instrument authority system may have a database of identifiers, values associated with the identifiers and merchants associated with the identifiers. The method may further receive a response at the POS device from the instrument authority system. Based at least in part on the response, the method may determine whether to dispense cash.

35 Claims, 5 Drawing Sheets

CASH REDEMPTION OF GIFT CARDS SYSTEMS AND METHODS

BACKGROUND

Embodiments of the present invention relate generally to money transfer networks and stored-value instrument systems. More specifically, but not by way of limitation, embodiments of the present invention relate to redeeming cash from stored-value instruments at points of service within a money transfer network.

Use of stored-value instruments has increased dramatically in recent years. Consumers purchase, or otherwise obtain, stored-value instruments, often in the form of gift cards, and use value associated with them to purchase goods or services at associated merchants. If a consumer is interested in or requires goods from a particular merchant, then using them in such a manner is convenient.

Problems arise, however, if a consumer holds a stored-value instrument redeemable at a merchant from whom they do not wish to purchase services or goods. For instance, a consumer may obtain a stored-value instrument in the form of a gift card, yet not desire anything sold by the merchant associated with the gift card. As gift cards are not typically exchangeable for cash or otherwise redeemable in any form other than purchases from the merchant, the value of the gift card to the consumer may be minimized. Additionally, selling the gift card on the open market may not be desirable due to fraud concerns or minimal demand. The systems and methods of the present invention provide solutions to these and other problems.

BRIEF DESCRIPTION OF THE INVENTION

In some embodiments, the invention provides a method of redeeming cash from a stored-value instrument. The method may, at a point-of-sale ("POS") device associated with a money transfer network, receive an identifier associated with the stored-value instrument. Money transfer networks are discussed in greater detail in U.S. Pat. No. 6,761,309, entitled "METHOD AND SYSTEM FOR PERFORMING MONEY TRANSFER TRANSACTIONS," issued on Jul. 13, 2004 to Earney E. Stoutenburg and Dean A. Seifert, which is herein incorporated by reference in its entirety for all purposes. The POS device may, merely by way of example, be one of many POS devices known in the art, including a financial transaction kiosk, an automated teller machine, a computer, and/or a cash register. POS devices are discussed in greater detail in U.S. patent application Ser. No. 10/225,410, entitled "MULTI-PURPOSE KIOSK AND METHODS," filed Aug. 20, 2002, by Paul A. Blair, Kenneth Algiene and Mark Thompson; U.S. patent application Ser. No. 11/100,327, entitled "INTEGRATING TRANSACTION FEATURES INTO A POS SYSTEM," filed Apr. 5, 2005, by Douglas Byerley and Timothy Maurer; U.S. patent application Ser. No. 11/241,810, entitled "MULTI-PURPOSE KIOSK AND METHODS," filed Sep. 29, 2005, by Donald L. Crowell, Paul A. Blair, Kenneth Algiene and Mark Thompson, which applications are herein incorporated by reference in their entirety for all purposes.

The stored-value instrument may possibly be a stored-value card, and receiving the identifier associated with the stored-value instrument may, merely by way of example, involve: inputting a card number from the stored-value instrument; swiping a magnetic stripe on the stored-value instrument through a magnetic stripe reader, where the identifier is encoded on the magnetic stripe; scanning a bar code on the stored-value instrument with a bar code reader, where the identifier is represented by the bar code; communicating with a radio-frequency identification ("RFID") tag on the stored-value instrument, wherein the identifier is represented by the RFID tag; and/or accessing a memory chip on the stored-value instrument, wherein the identifier is stored on the memory chip.

The method may transmit a request to redeem cash associated with the stored-value instrument to an instrument authority system, where the instrument authority system may, merely by way of example, have a database of identifiers, values associated with the identifiers, and merchants associated with the identifiers. Transmitting the request to redeem cash associated with the stored-value instrument to the instrument authority system may involve transmitting to a first system the request, where the first system may be a money transfer network, and then transmitting the request to a second system, which may be the instrument authority system. The request to redeem cash associated with the stored-value instrument may possibly include the identifier associated with the stored-value instrument. The request may further, for example, include a request for a specific amount of cash.

The method may receive a response at the POS device from the instrument authority system. The response may, merely by way of example, contain: a fraudulent activity notice; a declined notice; a delay notice and thereafter a declined notice; an insufficient funds notice; a delay notice and thereafter an approval notice; and/or an approval notice. Based at least in part on the response, the method may determine whether to dispense cash. Based on this determination, the method may possibly dispense cash.

In another embodiment the method may further include receiving information about a holder of the stored-value instrument. The information may, as an example, contain a name, an address, a phone number, and/or a driver license number. Some embodiments may further include receiving a request to redirect value associated with the cash. The method may reference information received about the holder of the stored value instrument to process the request to redirect value associated with the cash. Requests to redirect the value associated with the cash may, merely by way of example, include: a request to pay a bill with the value associated with the cash; a request to store on another stored-value instrument the value associated with the cash; and/or a request to transfer money to another person and fund said transfer with the value associated with the cash. Determining whether to dispense cash in such embodiments may be partly based on the request to redirect value associated with the cash. Some methods and system for transferring value between stored-value instruments are discussed in greater detail in U.S. patent application Ser. No. 09/955,747, entitled "METHOD AND SYSTEM FOR TRANSFERRING STORED-VALUE," filed Sep. 18, 2001, by Kurt Hansen and Joseph Cachey III, which is herein incorporated by reference in its entirety for all purposes.

In some embodiments the method may further include, at the POS device, redirecting the cash. Redirecting the cash at the POS device may, merely by way of example, include funding a money order with the value associated with the cash or funding a cashier check with the value associated with the cash. In some embodiments, the method may receive information about the holder of the stored-value instrument and reference the information received to redirect the cash.

In other embodiments, the invention provides a method of redeeming cash from a stored-value instrument. The method may, at a money transfer network, receive from a POS device associated with the money transfer network a request to redeem cash associated with the stored-value instrument. The request to redeem cash associated with the stored-value instrument may possibly include the identifier associated with the stored-value instrument. The request may further, for example, include a request for a specific amount of cash. In some embodiments the request may also include information about a holder of the stored-value instrument. The method may possibly store the information.

The method may transmit the request to redeem cash associated with the stored-value instrument to an instrument authority system. The instrument authority system may possibly have a database of identifiers, values associated with the identifiers, and merchants associated with the identifiers. The method may receive a response from the instrument-authority system. The response may, merely by way of example, contain: a fraudulent activity notice; a declined notice; a delay notice and thereafter a declined notice; an insufficient funds notice; a delay notice and thereafter an approval notice; and/or an approval notice. The method may transmit the response to the POS device. The POS device may, based at least in part on the response, determine whether to dispense cash.

The method may include receiving a request to redirect value associated with the cash and redirecting the value associated with the cash. Redirecting the value associated with the cash may, merely by way of example, include: paying a bill with the value associated with the cash; storing on another stored-value instrument the value associated with the cash; and/or transferring money to another person and funding said transfer with the value associated with the cash. The method may use information about the holder of the stored-value instrument to process the request to redirect the value associated with the cash.

In other embodiments, the invention provides a method of redeeming cash from a stored-value instrument. The method may, at an instrument authority system, receive a request to redeem cash associated with a stored-value instrument from a POS device associated with a money transfer network. The instrument authority system may possibly have a database of identifiers associated with stored-value instruments, values associated with the identifiers, and merchants associated with the identifiers.

The method may determine if the request to redeem cash associated with the stored-value instrument should be authorized. In some embodiments the request may include a request for a specific value, and determining if the request to redeem cash associated with the stored-value instrument should be authorized may possibly include comparing the value associated with the stored-value instrument to the specific value.

The method may transmit a response to the money transfer network. The money transfer network may transmit the response to the POS device. Based at least in part on the response, the POS device may determine whether to dispense cash. The method may also modify the database at the instrument authority system based at least in part on the response. Merely by way of example, such a modification may possibly include reducing the value associated with the stored-value instrument in the database if the response is an approval notice or modifying a fraud variable associated with the stored-value instrument in the database if the response is a fraudulent activity notice.

The method may further include receiving a request to store on a second stored-value instrument value associated with the cash. The method may modify the database based at least in part upon the request to store on the second stored-value instrument the value associated with the cash.

BRIEF DESCRIPTION OF THE DRAWINGS

The present disclosure is described in conjunction with the appended figures.

DETAILED DESCRIPTION OF THE INVENTION

Figure 1:
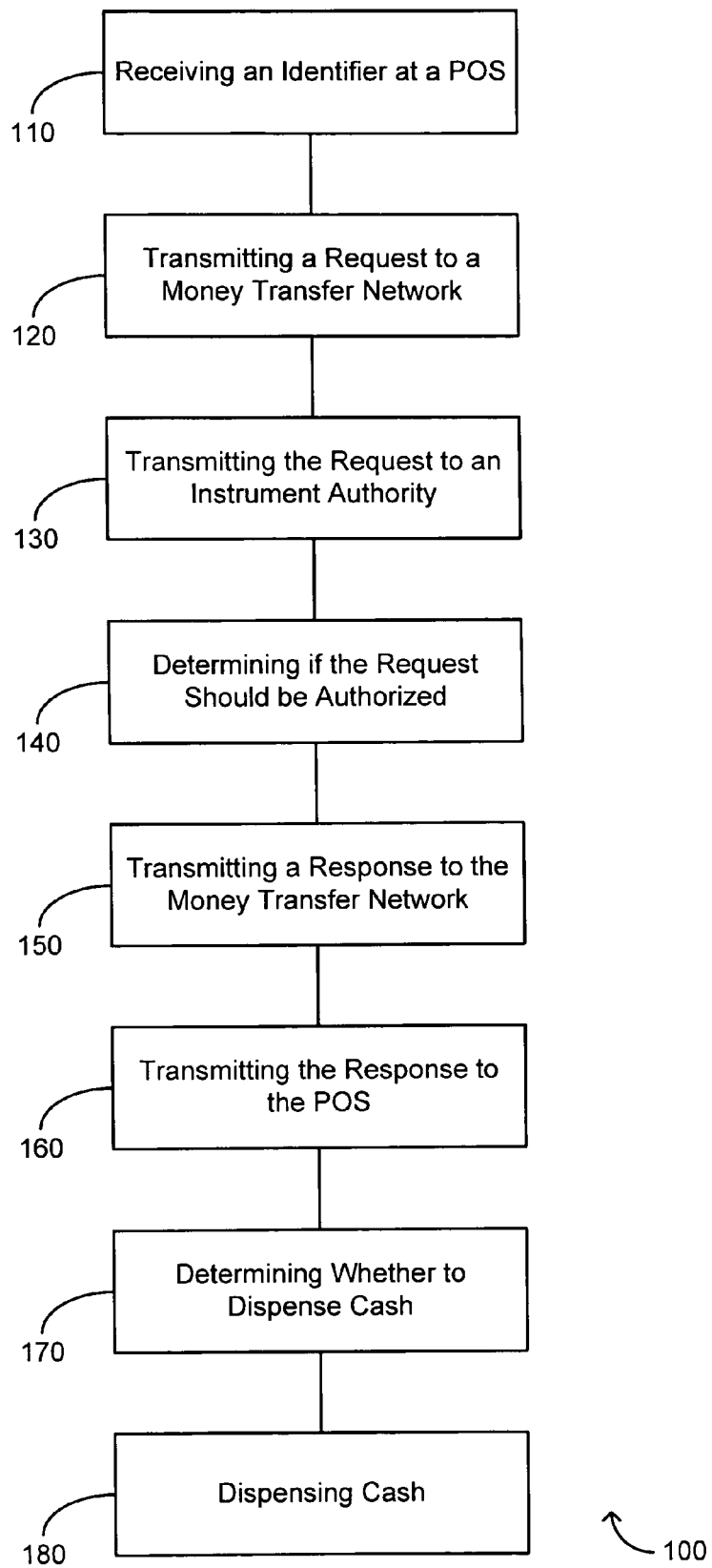
FIG. 1 shows one possible method of the invention which may be employed to redeem cash from a stored-value card.

In some embodiments, the present invention provides a method of redeeming cash from a stored-value instrument. The method may, at a point-of-sale ("POS") device associated with a money transfer network, receive an identifier associated with the stored-value instrument. The POS device may, merely by way of example, be one of many POS devices known in the art, including a financial transaction kiosk, an automated teller machine, a computer, and/or a cash register. The stored-value instrument may possibly be a stored-value card and receiving the identifier associated with the stored-value instrument may, merely by way of example, involve: inputting a card number from the stored-value instrument; swiping a magnetic stripe on the stored-value instrument through a magnetic stripe reader, where the identifier is encoded on the magnetic stripe; scanning a bar code on the stored-value instrument with a bar code reader, where the identifier is represented by the bar code; communicating with a radio-frequency identification ("RFID") tag on the stored-value instrument, wherein the identifier is represented by the RFID tag; and/or accessing a memory chip on the stored-value instrument, wherein the identifier is stored on the memory chip. A holder of the stored-value instrument or possibly an employee of the location where the POS device is located may cause the POS device to receive the identifier.

The method may transmit a request to redeem cash associated with the stored-value instrument to an instrument authority system, where the instrument authority system may, merely by way of example, have a database of identifiers, values associated with the identifiers, and merchants associated with the identifiers. The database may contain additional information associated with each identifier. Previous transaction information, consumer loyalty information, fraud protection information are examples of other possible types of information that may be associated with at least some of the identifiers in the database. Transmitting the request to redeem cash associated with the stored-value instrument to the instrument authority system may involve transmitting to a first system the request, where the first system may be a money transfer network, and then transmitting the request to a second system, which may be the instrument authority system. The request to redeem cash associated with the stored-value instrument may possibly include the identifier associated with the stored-value instrument. The request may further, for example, include a request for a specific amount of cash.

The method may receive a response at the POS device from the instrument authority system. The response may, merely by way of example, be: a fraudulent activity notice; a declined notice; a delay notice and thereafter a declined notice; an insufficient funds notice; a delay notice and thereafter an approval notice; and/or an approval notice. Based at least in part on the response, the method may determine whether to dispense cash. Based on this determination, the method may possibly dispense cash.

In another embodiment the method may further receive information about a holder of the stored-value instrument. The information may, as an example, include a name, an address, a phone number, and/or a driver license number. Some embodiments may further receive a request to redirect value associated with the cash. The method may reference information received about the holder of the stored value instrument to process the request to redirect value associated with the cash. Requests to redirect the value associated with the cash may, merely by way of example, include: a request to pay a bill with the value associated with the cash; a request to store on another stored-value instrument the value associated with the cash; and/or a request to transfer money to another person and fund said transfer with the value associated with the cash. Determining whether to dispense cash in such embodiments may be partly based on the request to redirect value associated with the cash.

In some embodiments the method may further, at the POS device, redirect the cash. Redirecting the cash at the POS device may, merely by way of example, include funding a money order with the value associated with the cash or funding a cashier check with the value associated with the cash. In some embodiments, the method may receive information about the holder of the stored-value instrument and reference the information received to redirect the cash.

Referring first to FIG. 1, one method 100 of the invention is shown in flow diagram form. At block 110, an identifier associated with a stored-value instrument is received at a POS. A request to redeem cash associated with a stored-value instrument is transmitted to a money transfer network at block 120. At block 130, the request is transmitted to an instrument authority system. The instrument authority then determines whether a request should be authorized at block 140. The instrument authority may use a variety of processes to determine whether to authorize the request. One possible process will be discussed below in regards to FIG. 4.

At block 150, the instrument authority system transmits a response to the money transfer network. The money transfer network transmits the response to POS at block 160. Based at least in part on the response, at block 170, the POS may determine whether to dispense cash. Possibly, a person, such as a clerk at the location of the POS may make the determination, based at least in part on the response. At block 180, the POS or possibly a clerk will dispense cash.

Figure 2:
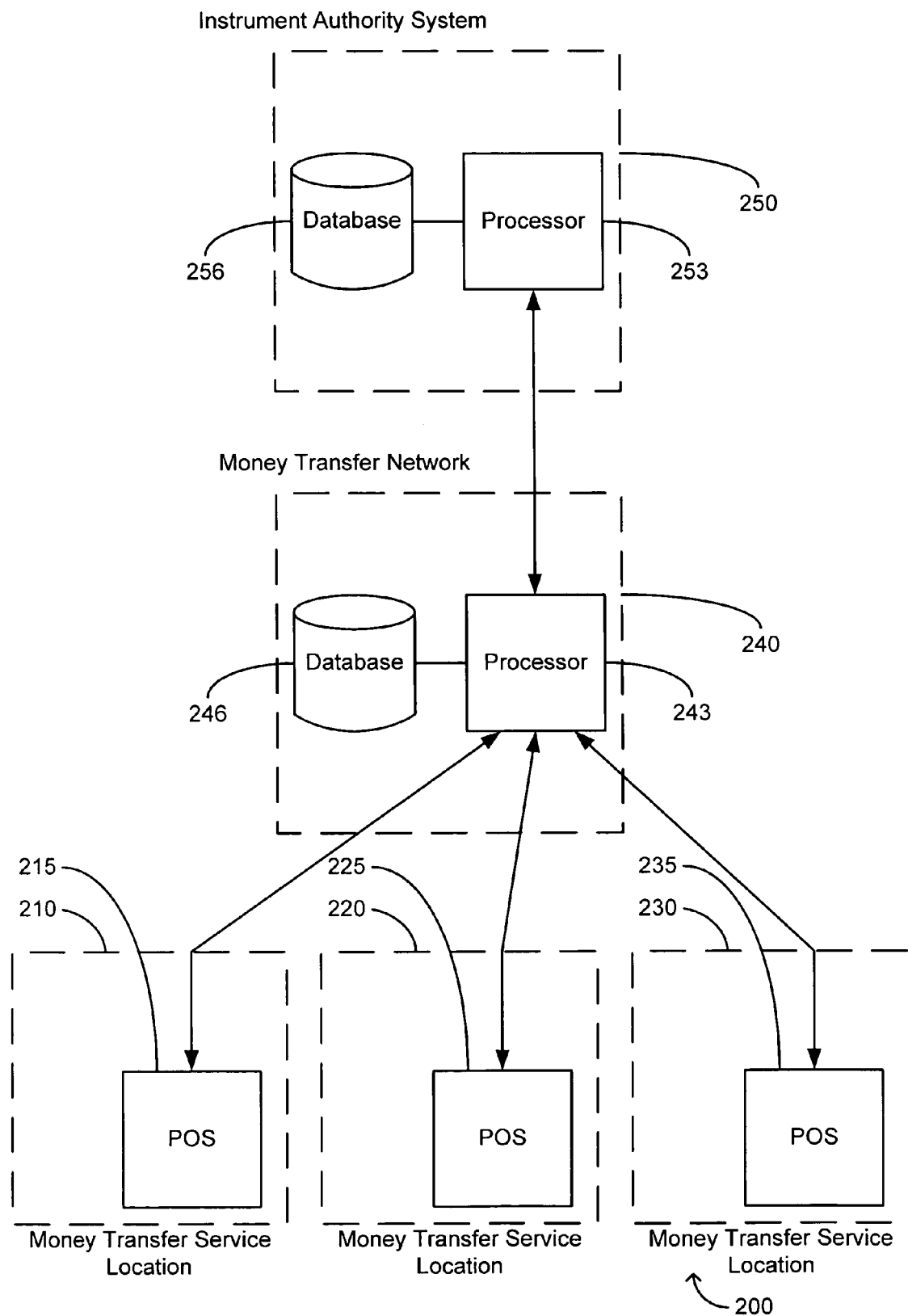
FIG. 2 is an example of a system capable of performing embodiments of the invention.

Referring now to FIG. 2, a block diagram of one example 200 of a system capable of implementing embodiments of the invention is shown. The system includes multiple money transfer service locations 210, 220, 230 which may be part of a money transfer service cooperative. Each money transfer service location has a POS 215, 225, 235. Each POS 215, 225, 235 is in communication with a money transfer network 240, specifically a processor 243 within the money transfer network 240. The processor 243 in this embodiment is shown in communication with a database 246. The database 246 may be used to store information as was discussed above in regard to various possible methods of the invention.

Also shown in FIG. 2 is an instrument authority system 250. The money transfer network 240 is in communication with the instrument authority system 250. This communication may possibly occur specifically between the processor 243 at the money transfer network 240 and a processor 253 at the instrument authority system. The instrument authority system 250 is shown having a database 256. The database 256 may possibly be used to store information as was discussed above in regard to various possible methods of the invention. Additionally, the database 256 may contain information regarding the amount of cash associated with a specific stored-value instrument, possibly being represented by an identifier associated with that specific stored-value instrument.

Figure 3:
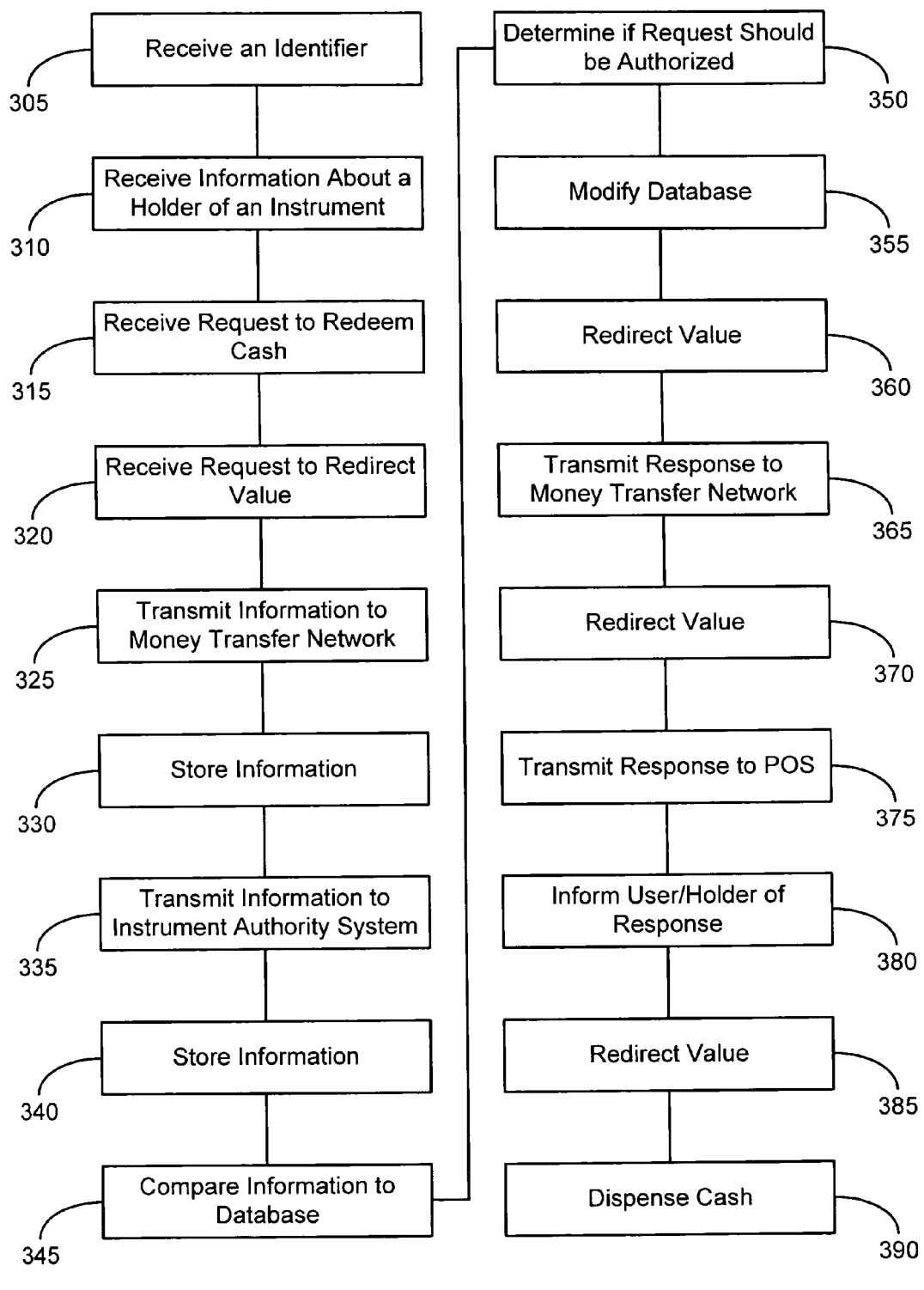
FIG. 3 shows another possible method of the invention which may be employed to redeem cash or redirect value from a stored-value card.

FIG. 3 shows another possible method 300 of the invention. At block 305, a POS may receive an identifier associated with a stored-value instrument. The POS may also receive information about a holder of the instrument at block 310. At block 315, the POS may receive a request to redeem cash from the stored-value instrument. Furthermore, at block 320, the POS may receive a request to redirect value associated with cash associated with the stored-value instrument. The method may then include transmitting information to a money transfer network at block 325, the information possibly including the identifier, information about the holder, the request to redeem cash or the request to redirect value.

At block 330, the money transfer network may store information from the transmission from the POS device. This information may include the identifier, information about the holder, the request to redeem cash or the request to redirect value. The money transfer network may then transmit information to an instrument authority system at block 335. At block 340, the money transfer network may store at least a portion of this information as the money transfer network did above at block 330.

At block 345, the instrument authority system compares information received from the money transfer network to information on a database that is in communication with the instrument authority system and, at block 350, determines if the request to redeem cash, and/or request to redirect value should be authorized. The database may contain information regarding the cash associated with identifiers that are associated with stored-value instruments. The instrument authority may use a variety of processes to determine whether to authorize the request. One possible process will be discussed below in regards to FIG. 4. Based at least in part upon this determination, the instrument authority system may modify the database at block 355. For instance, if the request to redeem cash and/or request to redirect value is authorized, the instrument authority system may reduce the amount of cash associated with the identifier in the database.

At block 360, the instrument authority system may, if such a request was received and authorized, redirect the value associated with the cash associated with an identifier. The instrument authority system may, for example, redirect the value to augment the value associated with another identifier. Merely by way of example, another possible request might be to redirect the value to pay a bill. Any request to redirect might use other information received with the request as described above. This data may be temporarily or permanently stored on a database in communication with the instrument authority system. Such a request might involve the instrument authority system communicating with a bill paying network and/or system. The instrument authority system might transmit a communication representative of a payment to such a network or system and possibly receive a confirmation from such other system that the payment is received.

The instrument authority may then transmit an authorization or declination of any received request response to the money transfer network at block 365. Other information may be contained in the response such as, for example, a fraudulent activity notice if the instrument authority system determines such a notice is proper. The instrument authority system may determine such a notice is proper, merely by way of example, if the instrument authority system is aware that certain identifiers are associated with stored-value instruments that have been stolen.

At block 370, the money transfer network may redirect the value of cash associated with an identifier. Merely by way of example, the money transfer network may transfer the value to a person specified by the holder of the stored-value instrument. The money transfer network may also be in communication with a bill paying system or network and redirect the value towards any number of bills as directed by a holder of the stored-value instrument.

At block 375, the money transfer network may transmit a response to the POS. This response could be any one or more of the following: informing the holder of the status of a request to redirect the value of the stored-value instrument; an approval of a request to redeem cash; a denial of a request to redeem cash; and/or a delay notice. At block 380 the POS may inform the user of the POS of the response. The user may, merely by way of example, be a store clerk at the money transfer service location or the holder of the stored-value instrument. In the case of fraudulent activity notices, the method may only inform a user of such a notice if the user is not the holder of the stored-value instrument.

At block 385, the POS may redirect value as requested by the user of the POS. Merely by way of example, the POS may redirect value onto a money order or cashiers check. If no redirection of value has been requested, the method may then, at block 390, dispense cash as requested by the user of the POS. The dispensed amount may be less a service fee charged by the money transfer service location, money transfer network, and/or instrument authority system. For example, if a person is a holder of a stored-value instrument which has a $100 associated with the identifier associated with the instrument, the person may request to redeem the entire value of stored-value instrument for cash. After employing the method detailed in any one or more of the above exemplary methods, the method may dispense $95 to the holder. This may be reflective of a $5 charge for providing the service of dispensing cash from a stored-value instrument. Similar service fees may be charged for redirecting value from stored-value instruments as well. Various schemes for determining the fees are possible, including, merely by way of example, flat-rate fees, percentage fees and tiered fees.

Figure 4:
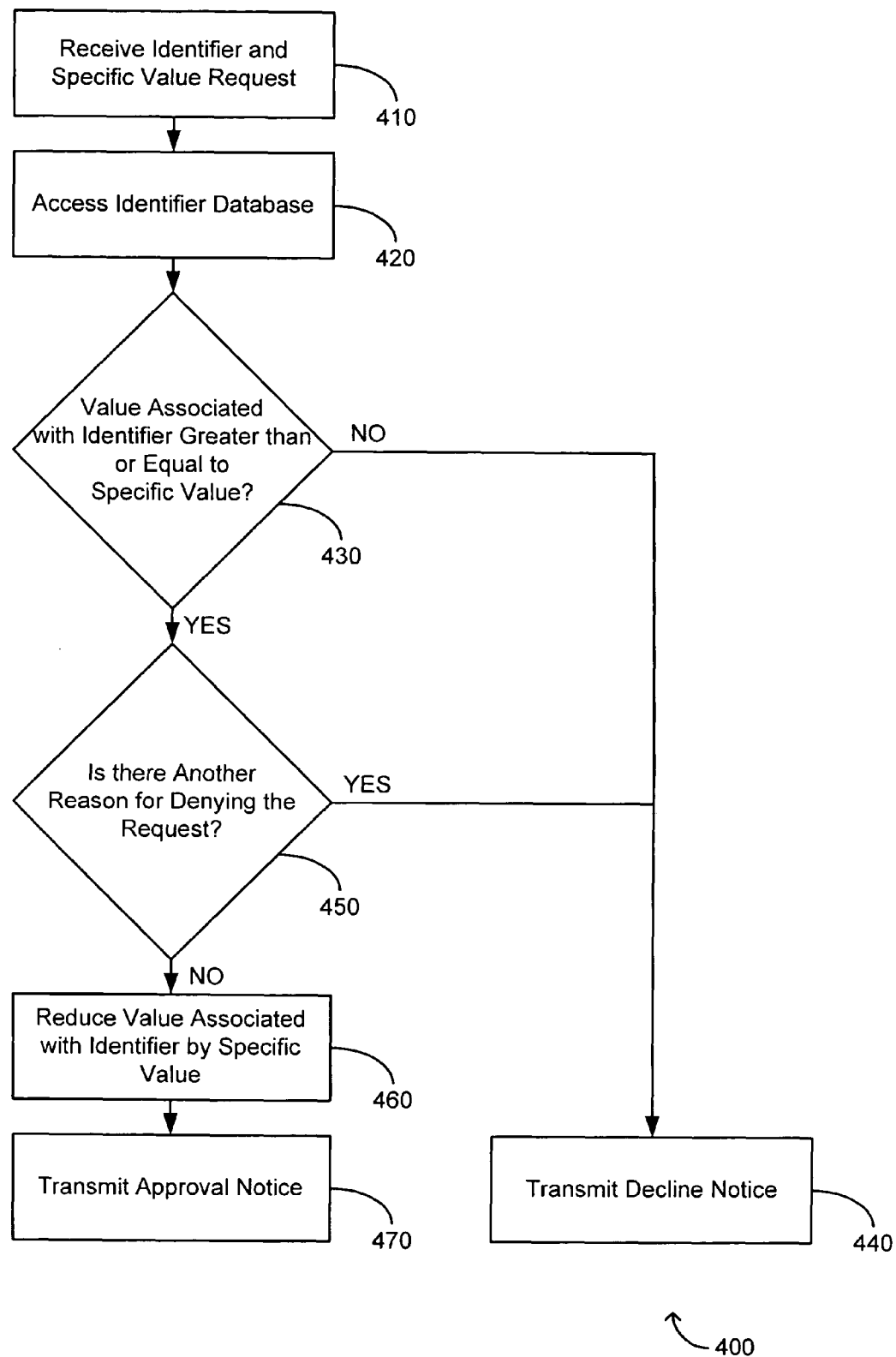
FIG. 4 shows an example of a process that may be used within the invention to determine if a request to redeem cash should be authorized.

Turning now to FIG. 4, one possible process for determining whether to approve a request to redeem cash associated with a stored-value instrument. An instrument authority system may employ this process in certain embodiments. At block 410, the instrument authority system receives an identifier and a request for a specific value. The instrument authority system, at block 420, accesses an identifier database that is in communication with, or part of, the instrument authority system. The instrument authority system then may compare the value associated with the identifier in the database with the specific value requested at block 430. If the value associated with the identifier in the database is greater than or equal to the specific value requested, then the process will proceed to its next step at block 450. If not, then the process will transmit a decline notice at block 440.

At block 450, the process will check to determine if there is another reason for declining the request to redeem cash. Merely by way of example, the method may check the database of identifiers to determine if there is a fraudulent activity flag or notice associated with the specific identifier. In another possible example, some identifiers may be associated with stored-value instruments which have been predetermined by their issuers to be unredeemable for cash. If the method determines that there is another reason besides insufficient funds for denying the request to redeem, the instrument authority system will transmit a decline notice at block 440.

If there is no other reason for denying the request to redeem, then the process, at block 460, will reduce the value associated with the identifier in the database by the specific value requested to be redeemed. The instrument authority system may then transmit, either directly or indirectly, an approval notice to the POS device at block 470.

Figure 5:
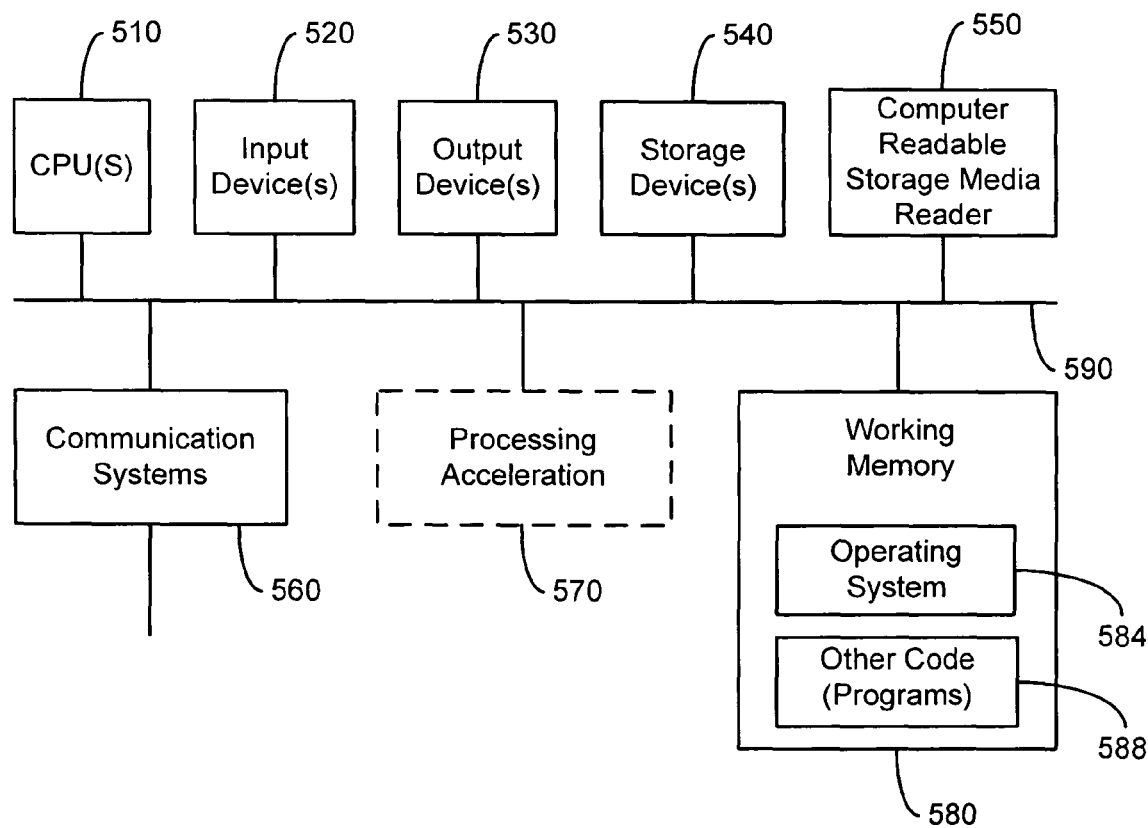
FIG. 5 is an example of a computer system capable of implementing the methods, or a particular portion of the methods, of the present invention.

FIG. 5 is a block diagram illustrating an exemplary computer system in which embodiments of the present invention may be implemented. This example illustrates a computer system 300 such as may be used, in whole, in part, or with various modifications, to provide the functions of the POS devices, the money transfer networks, the instrument authority systems and/or other systems providing functions such as those discussed above.

The computer system 500 is shown comprising hardware elements that may be electrically coupled via a bus 590. The hardware elements may include one or more central processing units (CPUs) 510, one or more input devices 520 (e.g., a mouse, a keyboard, etc.), and one or more output devices 530 (e.g., a display device, a printer, etc.). The computer system 500 may also include one or more storage device 540. By way of example, storage device(s) 540 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, etc.), and working memory 580, which may include RAM and ROM devices as described above. In some embodiments, the computer system 500 may also include a processing acceleration unit 570, which can include a DSP, a special-purpose processor and/or the like.

The computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. The communications system 560 may permit data to be exchanged with a network and/or any other computer described above with respect to the system 500.

The computer system 500 may also comprise software elements, shown as being currently located within a working memory 580, including an operating system 584 and/or other code 588. It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Software of computer system 500 may include code 588 for implementing any or all of the function of the various elements of the architecture as described herein. For example, software, stored on and/or executed by a computer system such as system 500, can provide the functions of the POS devices, the money transfer networks, the instrument authority systems. Methods implementable by software on some of these components have been discussed above.

The embodiments described herein are merely exemplary, and other possible embodiments are possible within the scope of the invention. Those skilled in the art will appreciate that various modifications, alternative constructions, and equivalents may be used without departing from the spirit of the invention. Additionally, a number of well known processes and elements have not been described in order to avoid unnecessarily obscuring the novelty of the present invention. Accordingly, the above description should not be taken as limiting the scope of the invention.

What is claimed is:

1. A method of redeeming cash from a gift card comprising:
   at a point-of-sale (POS) device associated with a money transfer network, receiving an identifier associated with the gift card, the gift card otherwise only being redeemable for goods or services from a particular merchant;
   transmitting, by the money transfer network, a request to redeem cash associated with the gift card to an instrument authority system, wherein:
      the instrument authority system comprises a database of identifiers, values associated with the identifiers, and merchants associated with the identifiers; and
      the particular merchant is in communication with the instrument authority system;
   receiving a response at the POS device of the money transfer network from the instrument authority system; and
   based at least in part on the response received by the POS device of the money transfer network, determining whether to dispense cash.

2. The method of claim 1, wherein the POS device comprises a selection from the group consisting of:
   a financial transaction kiosk;
   an automated teller machine;
   a computer; and
   a cash register.

3. The method of claim 1, wherein receiving the identifier associated with the gift card comprises a selection from the group consisting of:
   inputting a card number associated with the gift card;
   swiping a magnetic stripe associated with the gift card through a magnetic stripe reader, wherein the identifier is encoded on the magnetic stripe;
   scanning a bar code associated with the gift card with a bar code reader, wherein the identifier is represented by the bar code;
   communicating with a radio-frequency identification ("RFID") tag associated with the gift card, wherein the identifier is represented by the RFID tag; and
   accessing a memory chip associated with the gift card, wherein the identifier is stored on the memory chip.

4. The method of claim 1, wherein the gift card comprises a stored-value card.

5. The method of claim 1, wherein transmitting the request to redeem cash associated with the gift card to the instrument authority system comprises transmitting to a first system the request to redeem cash associated with the gift card, wherein the first system transmits the request to redeem cash associated with the gift card to a second system.

6. The method of claim 5, wherein the first system comprises the money transfer network, and the second system comprises the instrument authority system.

7. The method of claim 1, wherein the request to redeem cash associated with the gift card comprises the identifier associated with the gift card.

8. The method of claim 7, wherein the request to redeem cash associated with the gift card further comprises a request for a specific amount of cash.

9. The method of claim 1, wherein the response comprises a selection from the group consisting of:
   a fraudulent activity notice;
   a declined notice;
   a delay notice and thereafter a declined notice;
   an insufficient funds notice;
   a delay notice and thereafter an approval notice; and
   an approval notice.

10. The method of claim 1, further comprising:
    based on the determination, dispensing cash.

11. The method of claim 1, further comprising receiving information about a holder of the gift card.

12. The method of claim 11, wherein said information about the holder of the gift card comprises a selection from the group consisting of:
    a name;
    an address;
    a phone number; and
    a driver license number.

13. The method of claim 1, wherein the cash has a value associated therewith, the method further comprising receiving a request to redirect the value associated with the cash.

14. The method of claim 13, wherein the request to redirect the value associated with the cash comprises a selection from the group consisting of:
    a request to pay a bill with the value associated with the cash;
    a request to store on another gift card the value associated with the cash; or
    a request to transfer money to another person and fund said transfer with the value associated with the cash.

15. The method of claim 13, wherein determining whether to dispense cash is further based at least in part on the request to redirect the value associated with the cash.

16. The method of claim 13, further comprising:
    receiving information about a holder of the gift card; and
    referencing said information about the holder of the gift card to process the request to redirect the value associated with the cash.

17. The method of claim 1, further comprising, at the POS device, redirecting the cash.

18. The method of claim 17, wherein the cash has a value associated therewith, and wherein redirecting cash comprises a selection from the group consisting of:
    funding a money order with the value associated with the cash; or
    funding a cashier check with the value associated with the cash.

19. The method of claim 17, further comprising:
    receiving information about a holder of the gift card; and
    referencing said information about the holder of the gift card to redirect the cash.

20. A method of redeeming cash from a gift card comprising:
    at a money transfer network, receiving from a POS device associated with the money transfer network a request to redeem cash associated with the gift card, wherein the gift card is otherwise only redeemable for goods or services from a particular merchant and the particular merchant is in communication with the instrument authority system;
    transmitting the request to redeem cash associated with the gift card to an instrument authority system from the money transfer network, wherein the instrument authority system comprises a database of identifiers, values associated with the identifiers, and merchants associated with the identifiers;

receiving a response from the instrument-authority system at the money transfer network; and transmitting the response to the POS device of the money transfer network, wherein the POS device, based at least in part on the response, determines whether to dispense cash.

21. The method of claim 20, wherein the request to redeem cash associated with the gift card comprises an identifier associated with the gift card.

22. The method of claim 21, wherein the request to redeem cash associated with the gift card further comprises a request for a specific value.

23. The method of claim 20, wherein the request to redeem cash associated with the gift card comprises information about a holder of the gift card.

24. The method of claim 23, further comprising storing said information about the holder of the gift card.

25. The method of claim 20, wherein the response comprises a selection from the group consisting of:
a fraudulent activity notice;
a declined notice;
a delay notice and thereafter a declined notice;
an insufficient funds notice;
a delay notice and thereafter an approval notice; and
an approval notice.

26. The method of claim 20, wherein the cash has a value associated therewith, the method further comprising:
receiving a request to redirect the value associated with the cash; and
redirecting the value associated with the cash.

27. The method of claim 26, wherein redirecting the value associated with the cash comprises a selection from the group consisting of:
paying a bill with the value associated with the cash;
storing on another gift card the value associated with the cash; and
transferring money to another person and funding said transfer with the value associated with the cash.

28. The method of claim 26, further comprising:
receiving information about a holder of the gift card; and
referencing said information about the holder of the gift card to process the request to redirect the value associated with the cash.

29. A method of redeeming cash from a gift card comprising:
at an instrument authority system, receiving a request to redeem cash associated with a gift card from a POS device associated with a money transfer network, wherein:
the instrument authority system comprises a database of identifiers associated with gift card, values associated with the identifiers, and merchants associated with the identifiers;
the gift card is otherwise only redeemable for goods or services from a particular merchant; and
the particular merchant is in communication with the instrument authority system;
determining, by the instrument authority system, if the request from the money transfer network to redeem cash associated with the gift card should be authorized; and
transmitting, by the instrument authority network, a response to the money transfer network, wherein the money transfer network transmits the response to the POS device, and wherein based at least in part on the response, the POS device determines whether to dispense cash.

30. The method of claim 29, wherein the request to redeem cash associated with the gift card comprises a request for a specific value, and determining if the request to redeem cash associated with the gift card should be authorized comprises comparing the value associated with the gift card to the specific value.

31. The method of claim 29, further comprising modifying the database based at least in part upon said response.

32. The method of claim 31, wherein modifying the database based at least in part upon said response comprises reducing the value associated with the gift card in the database if the response is an approval notice.

33. The method of claim 31, wherein modifying the database based at least in part upon said response comprises modifying a fraud variable associated with the gift card in the database if the response is a fraudulent activity notice.

34. The method of claim 29, wherein the cash has a value associated therewith, the method further comprising:
receiving a request to store on a second gift card the value associated with the cash;
modifying the database based at least in part upon the request to store on the second gift card the value associated with the cash.

35. A method of redeeming cash from a gift card comprising:
at a POS device associated with a money transfer network, receiving an identifier associated with the gift card, wherein the gift card is otherwise only redeemable for goods or services from a particular merchant;
transmitting, from the POS device associated with the money transfer network, a request to redeem cash associated with the gift card to the money transfer network, wherein the request comprises the identifier associated with the stored value instrument and a request for a specific value;
at the money transfer network, transmitting the request to redeem cash associated with the gift card to an instrument authority system, wherein:
the instrument authority system comprises a database of identifiers associated with the gift card, values associated with the identifiers, and merchants associated with the identifiers; and
the particular merchant is in communication with the instrument authority system
at the instrument authority system, determining if the request to redeem cash associated with the gift card should be authorized, wherein determining if the request to redeem cash associated with the gift card should be authorized comprises comparing the request for the specific value with the value associated with the identifier associated with the gift card;
transmitting a response to the money transfer network from the instrument authority system, wherein the response is based at least in part upon the determination if the request to redeem cash associated with the gift card should be authorized;
at the money transfer network, transmitting the response to the POS device;
at the POS device, determining whether to dispense cash, wherein determining whether to dispense cash is based at least in part upon the response; and
based on the determination of whether to dispense cash, dispensing cash.

* * * * *